United States Patent Office 3,421,061
Patented Jan. 7, 1969

3,421,061
MULTIFREQUENCY RECEIVING SIGNAL SUMMING MULTIPHASE INDUCTION MOTOR
George W. Baughman, Swissvale, Pa.
(7503 W. Hutchinson Ave., Pittsburgh, Pa. 15218)
Filed Apr. 5, 1966, Ser. No. 540,395
U.S. Cl. 318—172                    16 Claims
Int. Cl. H02p 1/46

ABSTRACT OF THE DISCLOSURE

This invention relates to a signal summing multiphase induction motor which has an output shaft, the rotational speed of which is a function of the algebraic sum of a plurality of signals of varying frequencies delivered to the summing motor. A signal generating unit provides a plurality of variable frequency signal outputs as well as a neutral or direct current signal output. The delivery of these outputs from the signal generating unit to the signal suming motor is controlled by a signal selection control unit.

---

This invention relates to a signal summing motor.

More specifically, this invention relates to a signal summing multiphase induction motor which has an output shaft, the rotational speed of which is a function of the algebraic sum of a plurality of signals of varying frequencies delivered to the summing motor. A signal generating unit provides a plurality of variable frequency signal outputs as well as a neutral or direct current signal output. The delivery of these outputs from the signal generating unit to the signal summing motor is controlled by a signal selection control unit.

The ever increasing complexity of systems that must handle constantly varying parameters has continuously brought the system designers' focus of attention to the need for reliable signal summing devices. Where multiphase signals having variable frequencies and low power levels are involved, solid state summing devices may meet the need. But in the event that there are sudden changes in power level or the range of frequencies summed or compared, then the cost of prior art summing devices soars. Furthermore, these prior art devices usually have but a single capability, that is, they may add two or more signals of varying frequencies, or in the alternative, they may subtract one variable frequency signal from another. The ability to provide these two just noted capabilities in one device breeds an expensive and complex system. The invention to be described hereafter meets all these needs at modest cost with soul satisfying simplicity never before attained. Not only will the use of this invention permit the multiple addition of a number of variable frequency signals but also the subtraction of any one signal from the remaining signal or signals. Finally, the invention permits the instant selection of any single variable frequency signal to the exclusion of the remaining signals. The invention with its pregnant capabilities finds an especially useful environment in my copending application for Letters Patent of the United States, Ser. No. 539,350, filed Apr. 1, 1966, for Vehicle Velocity Rate of Change Control System.

It is therefore an object of this invention to provide a variable frequency signal summing system which utilizes induction motor principles to accomplish this end. While the induction motor is used throughout this presentation, the same general results may be obtained with synchronous motors.

Another object of this invention is to provide a system that has the capability of adding two or more variable frequency signals as well as the capability of subtracting any one or more than one of the variable frequency signals from those remaining variable frequency signals, all of this within a rugged device at modest expense.

Yet another object of this invention is to provide a variable frequency signal summing system which is immune to the deleterious effects of sudden power change or signal frequency excursion through the employment of a novel multistator-rotor induction motor.

In the attainment of the foregoing objects there is employed a multiphase induction motor capable of providing an algebraic sum of the signals applied to the motor. The signal summing motor of the invention includes, in the preferred embodiment to be described, outer and inner rotor elements. These rotor elements in one embodiment are concentrically mounted for rotation about a common axis with the inner rotor element in driving connection with an output shaft of the signal summing motor. Positioned externally of the rotor elements is an outer stator arrangement. The outer rotor previously mentioned has integrally associated therewith an inner stator arrangement. The signal summing motor output shaft will have a rotational speed which is the function of the algebraic sum of the signals delivered to the outer and inner stators.

A signal generating means provides a plurality of multiphase variable frequency signal outputs or a neutral direct current signal output.

The first basic component of the signal summing system takes the form of a signal selection control unit which controls the delivery of the various outputs from the signal generating means to the outer and inner stators of the signal summing induction motor.

In the preferred embodiment there are included within the signal generating means a first multiphase variable frequency signal source and a second multiphase variable frequency signal source. Accordingly, in this embodiment the summing motor output shaft has a rotational speed which is a direct function of the first or second multiphase variable frequency signal delivered to the outer stator or inner stator, respectively, when the neutral direct current signal is simultaneously delivered to the inner stator or outer stator, respectively.

Finally, the rotational speed of the summing motor output shaft is a direct function of the algebraic sum of the first and the second multiphase variable frequency signals when the first and the second multiphase variable frequency signals are simultaneously applied respectively to the outer and the inner stators.

It is of course to be understood that while the preferred embodiment sets forth but two variable frequency signal sources, the invention contemplates any number of such sources along with the appropriate stator-rotor arrangement called for by the invention.

Other objects and advantages of the present invention will become apparent from the ensuing description of illustrative embodiments thereof, in the course of which reference is had to the accompanying drawings in which.

A description of the above embodiments will follow and then the novel features of the invention will be presented in the appended claims.

Figure 1:
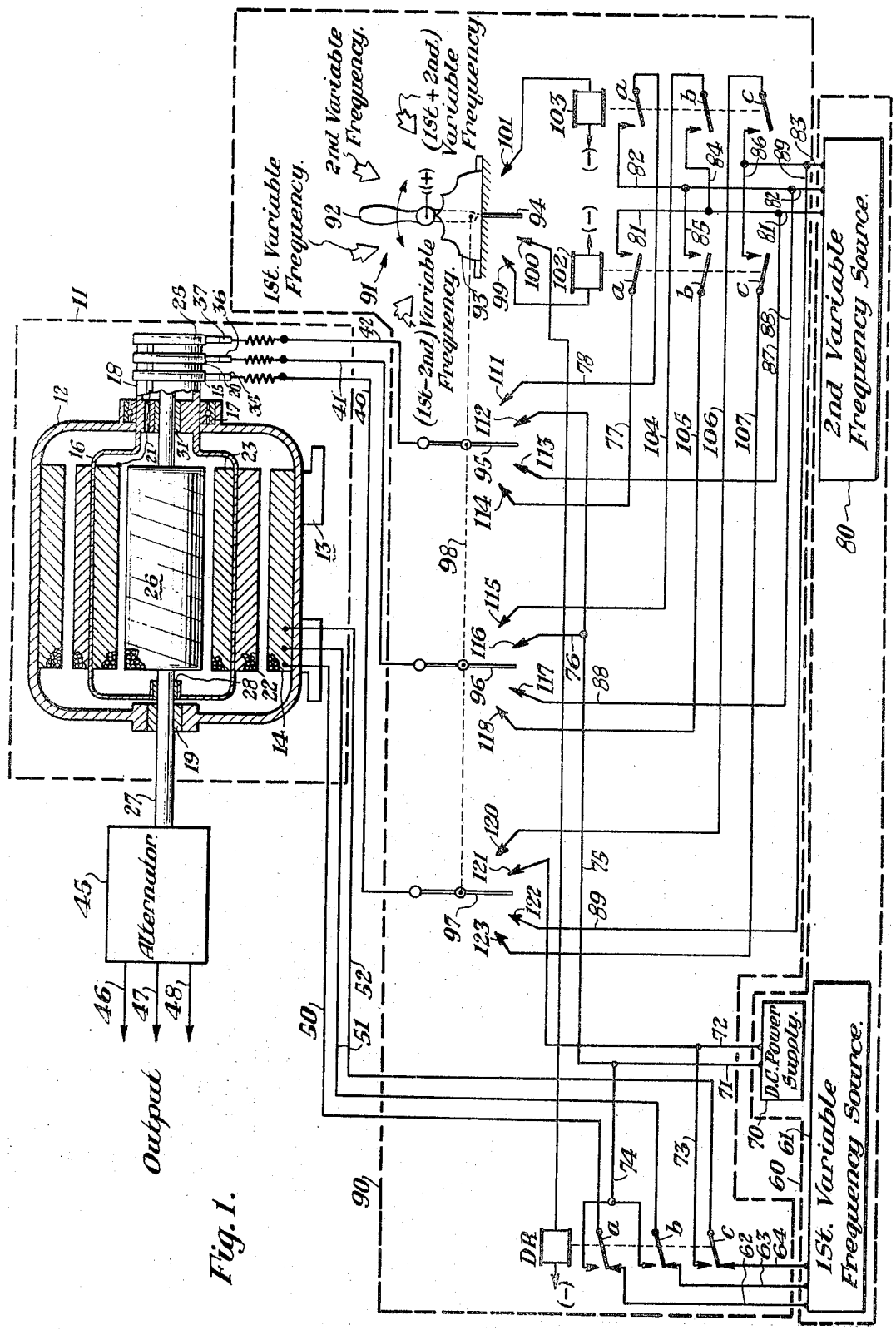
FIG. 1 illustrates the preferred embodiment of the invention.

Reference is now made to FIG. 1 in which there is illustrated the preferred embodiment of this invention. In order that the explanation of this invention be facilitated, certain portions of the system depicted in FIG. 1 have been outlined in a dotted fashion to generally designate means which make up the entire system. Accordingly, at the top of the figure there is shown in dotted outline the induction signal summing motor 11. Directly beneath it there is in dotted outline a signal selection control means 90, and finally the third major component of this system takes the form of a signal generating means 60, shown in dotted outline at the bottom of the figure.

Referring specifically now to the induction signal summing motor 11. This special purpose motor, which embodies the invention, is characterized by the fact that in this embodiment there is provided a single outer casing 12 of the signal summing motor. The outer casing 12 has a base 13 which carries the outer casing 12, which outer casing 12 includes a stator winding 14. This stator winding 14 receives a multiphase source of power to be described hereafter through electrical leads 50, 51 and 52. This source of power may be a variable frequency signal delivered to the stator 14, which stator as noted earlier is positioned in the outer casing 12. Positioned within the outer casing 12 is a rotor element 16 which is mounted for rotation within the outer casing 12 and is supported for rotation within the outer casing 12 by bearings 17 and 19 positioned at either end of the rotor element 16. The rotor element 16 has included therein a unique rotor-stator arrangement which will now be described.

Positioned integrally with the rotor element 16 is a rotor winding 22, which rotor winding 22 cooperates with the stator winding 14 of the outer casing 12 to provide a conventional rotor-stator-motor relationship. It will be appreciated that the rotor element 16, along with its rotor winding 22, will be driven at a rate dependent upon the frequency of the signal delivered via the leads 50, 51 and 52 to the stator winding 14.

Positioned within, and integrally attached to, the rotor winding 22 is an inner stator winding 23. This stator winding, as it is referred to hereafter, is unique in that the stator winding 23 is carried by the rotor element 16. The stator winding 23 is electrically connected via the multi-wire electrical lead 21 to a set of rings 15, 20 and 25, which rings are positioned upon the rotor element hollow shaft 18. It will be appreciated that these rings 15, 20 and 25 rotate with the rotor element 16. Resting on these rings 15, 20 and 25 are a set of spring-loaded brushes 35, 36 and 37 which are electrically connected to electrical leads 40, 41 and 42. Over these brushes and these rings are delivered to the inner stator 23 power of a multiphase nature, or of a direct current nature, depending upon the operation of the summing motor which will be explained more fully hereafter. It should also be recognized at the outset that there may be delivered to the outer stator winding 14 over the leads 50, 51 and 52 either a multiphase variable frequency signal or a direct current signal. Positioned within the rotor element 16 there is an internal rotor winding 26 which is mounted upon the summing motor output shaft 27. This summing motor output shaft 27 is mounted for rotation within the rotor element 16 by bearings 28 and 31 positioned at either end of the rotor winding 26. Accordingly, this rotor winding 26 will be driven at a rate dependent upon the frequency of the signal delivered to the inner stator winding 23 in a manner to be described hereafter.

Without going into the rest of the system at this time some basic concepts must be reviewed in order that the operation of the system be fully appreciated. Imagine that the following conditions arise. When there is delivered over the electrical leads 50, 51 and 52 a multiphase variable frequency signal to the stator winding 14, the rotor winding 22 carried by the rotor element 16 will be driven at a rotational speed directly proportional to the frequency of the signal delivered to the stator winding 14. The electrical phenomena that cause the rotor to move is conventional and a detailed explanation thereof will not be made in this application. If, simultaneously with the application of the multiphase variable frequency signal to the stator winding 14, there is applied to the inner stator 23 via the multi-wire electric wire lead 21, from rings 15, 20 and 25 and brushes 35, 36 and 37, a direct current signal, then there will be impressed in the inner stator winding 23 an electric field which will produce a magnetic flux link between the inner stator 23 and the rotor winding 26 which will cause the rotor 26 to maintain a fixed position with reference to the stator winding 23. Accordingly, since the stator winding 23 is carried by the rotor, any rotational movement of the rotor element 16 along with its rotor winding 22 will in turn cause the stator 23 to move within the rotor element 16, and thereby cause the inner rotor 26 to rotate in unison with the rotor element 16. In this situation it will be appreciated, therefore, that the final rotary output of the shaft 27 will bear a directly proportionate relationship to the rotary speed achieved by the rotor element 16. Therefore, the summing motor output shaft 27 will have a rotational speed directionally proportional to the frequency of the signal delivered to the outer stator winding 14.

The next set of conditions to be described occur when a direct signal is applied to the outer stator winding 14 via the leads 50, 51 and 52. When this occurs a magnetic field is developed which causes the rotor element 16 and its rotor winding 22 to remain in a fixed position within the magnetic field created by the direct current signal applied to the stator winding 14. This of course causes the rotor element 16 to remain in a stationary position and under these circumstances it will be appreciated that when a multiphase variable frequency signal is applied via the leads 40, 41 and 42 through the spring-loaded brushes 35, 36 and 37 to the rings 15, 20 and 25, and multi-wire cable 21, to the inner stator 23, there will then be within the stator 23, which is now stationary, a rotating electromagnetic field which will cause the rotor element 26 to rotate at a speed directly proportional to the variable frequency signal delivered to this inner stator 23. Accordingly, the summing motor output shaft 27 will have a rotational speed which is directly proportional to the variable frequency signal delivered to the inner stator 23 when a direct current signal is applied to the outer stator 14.

In addition to this basic capacity to apply either an output shaft rotational speed which is a direct function of either of two variable frequency signals delivered to the summing motor, there is the additional capacity to provide the algebraic sum of the signals being delivered to the summing motor 11.

There will now be described that situation which will arise where one variable frequency signal will have added to it the second variable frequency signal to produce a rotational output speed of the shaft 27 which bears a direct function to the sum of the frequencies delivered to the summing motor 11.

In addition, the summing motor has the capacity of providing subtraction of one of the sources of variable frequency from the remaining source of variable frequency energy delivered to the summing motor 11. When this function is accomplished the algebraic difference which is obtained will be represented by the rotational speed of the output shaft 27. This rotational speed of the output shaft 27 will bear a direct relationship to the arithmetical difference, or, as the case may be, the algebraic sum of the variable frequency signals delivered to the summing motor.

Where it is desired to add the signals together, the polarity of the variable frequency signal delivered to the outer stator 14 via leads 50, 51 and 52, and the polarity of the signal delivered to the inner stator 23 must be of the same nature. Therefore, in this situation there will arise a rotating magnetic field within the outer stator 14 which will in turn cause the inner rotor winding 22 and its rotor element 16 to rotate at a speed directly proportional to the frequency of the variable frequency signal delivered to the stator 14. Simultaneously there will be impressed upon the inner stator 23 via the multi-wire cable 21, rings 15, 20 and 25, and brushes 35, 36 and 37, a variable frequency signal from the leads 40, 41 and 42. The rotating electromagnetic field produced in the stator 23 will have an adding effect in that the rotating field due to electrical currents flowing in the stator 23 will be mechanically rotated at a speed directly proportional to the frequency of the signal delivered to the outer stator 14. Accordingly, the inner rotor 26 will experience the equivalent rotating electromagnetic field which is the sum of the frequencies delivered to the outer stator 14 and the inner stator 23. In this situation the output shaft 27 will have a rotational output directly proportional to the sum of the frequencies delivered to the summing motor 11.

In the event that the multiphase variable frequency signal being applied to the inner stator 23 has its polarity reversed so that the electromagnetic field rotates in a direction opposite to the direction of rotation of the electromagnetic field present in the outer stator 14, there will result a subtracting of the rate of rotation of the field of the inner stator 23 from that of the outer stator 14. This in effect, will be a mechanical subtraction for the inner rotor 26 will experience the presence of a rotating magnetic field, which rotating field represents the difference between the frequency delivered to the outer stator 14 and the inner stator 23. This is brought about by the fact that the rotating field in the outer stator 14 and inner stator 23 have an opposite rotational direction.

There is connected directly to the summing motor output shaft 27 an alternator 45 which has been depicted here to show one manner in which the rotor output from the summing motor may be utilized. In this particular embodiment the alternator 45 would produce an output on the electrical leads 46, 47 and 48 which would have a directly proportionate frequency relationship to the sum or difference of the signals delivered to the summing motor 11.

At the bottom of FIG. 1 there is depicted the signal generating means 60 noted earlier. Included in the signal generating means 60 there is a first variable frequency source 61 and a second variable frequency source 80. Both the first variable frequency source 61 and the second variable frequency source 80 have multi-phase variable frequency outputs. The first variable frequency source may very well be an alternator which has a multiphase output, and the second variable frequency source 80 will have a multiphase output and this variable frequency source may also be an alternator. The selection of an alternator to provide the multiphase variable frequency signal is not intended to limit in any manner the scope of the invention for any variable frequency signal source may be employed.

While this invention does not set forth the environment in which these variable frequencies arise, in one of the embodiments shown in my copending application Ser. No. 539,350, above referred to, in which this invention finds special use, the first variable frequency source is in fact a variable frequency which is dependent upon a vehicle speed, and the alternator which forms a part of this variable frequency source in this one particular embodiment is actually an axle driven alternator. The second variable frequency source 80, on the other hand, is designed in the related system just noted to provide a signal of an incremental frequency which is to be added or subtracted from the first variable frequency source. Again, this incremental frequency, or in the alternative a pure variable frequency, source may be formed by an alternator driven at some predetermined speed to thereby present a constant incremental frequency, or in the alternative the alternator or generator delivering the variable frequency may be an infinitely variable frequency source dependent upon the means that is driving the alternator that is providing the variable frequency signal. In either case there will be a multiphase variable frequency signal delivered from the first variable frequency source 61 over the electrical leads 62, 63 and 64.

On the other hand, the second variable frequency source 80 will have a multiphase variable frequency signal delivered over the electrical leads 81, 82 and 83.

There is also included within the signal generating means 60 a direct current power supply 70. The direct current power supply 70 may be of any conventional type and need only present sufficient direct current power to provide the essential electromagnetic field within the summing motor 11 to maintain each of the rotor elements stationary with respect to its relative stator element.

Interposed between the signal generating means 60 and the summing motor 11 there is the signal selection control means 90, shown in dotted outline in this figure. The signal selection control means 90 includes a signal selector 91, shown by the arrow leading from the numeral 91. This signal selector 91 has a signal selector handle 92, which handle cooperates with a notched control plate 93 to permit the signal selector handle 92 to assume one of four different positions on the periphery of the notched plate 93. Integrally connected to the handle 92 is the signal selector contact arm 94 which depends directly from the handle 92. There is connected to be moved in unison with the signal selector contact arm 94 the contact arms 95, 96 and 97. The movement of these last noted arms is controlled by the mechanical linkage 98 from the contact arm 94. Accordingly, each of the contact arms 94, 95, 96 and 97 moves in unison and in parallel so that any position selected by the selector control handle 92 is reflected in a similar position or movement of the contact arms 95, 96 and 97.

Connected to the signal selector handle 92 is a positive battery terminal which will provide power for the circuits which will be completed by the contact arm 94 as it moves into contact with the contacts 99, 100 and 101. The signal selector control handle 92, in this figure, is shown midway between two positions and therefore this position represents a neutral position in which no circuits are completed. As the figure illustrates and the reference legends show there are four distinctive positions designated by arrows to which this signal selector handle 92 may be moved. The first position is to the far right, and when this position is assumed, there will be a first and second variable frequency added. In the next position, moving from right to left, there will only be present the second variable frequency signal, and the third position from the right will provide an output from the signal summing motor which is representative of the first variable frequency. Finally, in the fourth or last position to the left, there will be an output delivered from the signal summing motor which is indicative of the difference between the first and second variable frequency signals which have been delivered from the signal generating means 69 in the form of the first and second variable frequency sources 61 and 80 before noted.

When the signal selector control handle 92 is moved to its extreme right position, that is, that position which the arrow designates will provide the addition of the first and second variable frequency signals, the following circuits will be completed. With the signal selector control handle in the far right-hand position the contact arm 94 will complete a circuit with the contact 99, and the circuit will be completed from the positive battery terminal, the handle 92, contact 94, contact 99, through relay 102, to the negative battery terminal. This will cause the relay 102 to pick up and complete a circuit over its front contacts $a$, $b$ and $c$. With the relay 102 picked up, the following circuit will be completed from the second variable frequency source 80. Before the circuit between the second variable frequency source 80 and the contacts $a$, $b$ and $c$ of the relay 102 just mentioned is traced, it should be kept in mind that the contact arms 95, 96 and 97 are respectively in their left-hand position and are in contact with contacts 114, 118 and 123, respectively.

Keeping this in mind, each of the circuits from the second variable frequency source 80 will be traced starting with the circuit that includes the variable frequency signal delivered over the lead 81 from the variable frequency source 80. This circuit is completed from the second variable frequency source 80, electrical lead 81, front contact *a* of relay 102, lead 77, contact 114, contact arm 95, electrical lead 42, spring-loaded brush 37, ring 25, to multi-wire cable 21, and finally to the stator 23.

Lead 82, which emanates from the second variable frequency source 80, and the circuit it completes with the summing motor is as follows: it includes the electrical lead 82, lead 85, front contact *b* of relay 102, lead 105, contact 118, contact arm 96, lead 41, spring-loaded brush 36, ring 20, multi-wire cable 21, and finally to the stator 23. The last lead from the multiphase variable frequency source 80 completes a circuit over the electrical lead 83, lead 86, front contact *c* of relay 102, lead 107, contact 123, contact arm 97, lead 40, spring biased brush 35, ring 15, multi-wire cable 21, and finally to the stator 23. It will therefore be appreciated that when the selector handle 92 is in its far right-hand position, the second variable frequency source 80 with its multiphase output will be delivered via the electrical leads 81, 82 and 83, through to the inner stator 23 of the summing motor 11 where this multiphase variable frequency signal will produce a rotating electromagnetic field within the stator 23.

Simultaneously with the application of the second variable frequency signal from the second variable frequency source 80 there will be an application of the first variable frequency signal from the first variable frequency source 61. This signal will be delivered over the electrical leads 62, 63 and 64 which emanate from the first variable frequency source 61. Accordingly, three separate circuits will be traced from the first variable frequency source 61 to the summing motor 11. The first circuit starts with the electrical lead 62, the back contact *a* of the relay DR, lead 50, and finally to outer stator 14. The next lead emanating from variable frequency source 61 is electrical lead 63 which completes a circuit over the back contact *b* of the relay DR, lead 51, and finally to outer stator 14. Lastly, the electrical lead 64 completes a circuit over the back contact *c* of the relay DR, lead 52, and finally to the outer stator 14. Accordingly, there will be delivered to the outer stator 14 a first variable frequency signal which will produce a rotating electromagnetic field in the outer stator 14. This will cause the rotor 22 to be driven at a rate which is directly proportional to the first variable frequency signal delivered over the circuits just described. This rotational movement of the rotor 22 will therefore cause the stator 23 to be rotated, and since by design the rotating electromagnetic field in the stator 23 is in the same rotary direction as the rotation of the electromagnetic field in the outer stator 14, the cumulative effect will be to add the two frequencies together to produce a final rotational output evidenced by the rotation of the inner rotor 26 which in turn drives the signal summing motor output shaft 27 at a rate which is directly proportional to the sum of the frequencies of the signals provided by the first variable frequency source and the second variable frequency source.

It will be appreciated that the relay DR, noted above, whose function will be described more fully hereafter, is included in the system to provide a control over the application of direct current power to the outer stator winding 14 in a manner which will be described more fully hereafter.

When the signal selector handle 92 is in the second position designated by the arrow and the legend indicating the delivery of only the second variable frequency signal, the following circuits will be completed. The contact arm 94 will be in electrical contact with the contact 100 which will complete a circuit from the positive battery terminal, signal selector handle 92, contact arm 94, contact 100, relay DR, to the negative battery terminal, which will energize the relay DR and will then cause a circuit to be completed over the front contacts *a*, *b* and *c* of the relay DR. With the relay DR picked up, a circuit will be completed which will permit the passage of direct current power from direct current power supply 70 over the electrical leads 71 and 72, respectively, leads 73 and 74, front contacts *c*, *a* and *b* of relay DR, to electrical leads 52 and 51, respectively. The direct current power will be then delivered over the electrical leads 52, 51 and 50 to the outer stator winding 14. The direct current signal impressed upon the outer stator winding 14 will produce a stationary magnetic field which will cause the rotor 22 to remain stationary with respect to the outer stator winding 14.

With the selector handle 92 in the position just noted, that is, with the contact arm 94 completing a circuit over the contact 100, the contact arms 95, 96 and 97 will also complete circuits over the contacts 113, 117 and 122. The closing of these three contacts will bring about the completion of the following three circuits. Starting with the second variable frequency source 80 and the electrical lead 81 which emanates therefrom, the circuit that may be traced between the second variable frequency source 80 and the inner stator 23 of the summing motor 11 is as follows: The circuit includes electrical lead 81, lead 87, contact 113, contact arm 95, lead 42, spring-loaded brush 37, ring 25, multi-wire cable 21, and finally the inner stator 23. The second circuit to be traced starts with the electrical lead 82 emanating from the second variable frequency source 80, and includes the electrical lead 88, contact 117, contact arm 96, lead 41, spring-loaded brush 36, ring 20, multi-wire cable 21, and finally to the inner stator 23. The last circuit emanating from the second variable frequency source 80 includes the electrical lead 83, lead 89, contact 122, contact arm 97, lead 40, spring-loaded brush 35, ring 15, multi-wire cable 21, and thence to the inner stator 23.

It will therefore be appreciated that with the signal selector handle 92 in the second position there will be a direct current signal impressed on the outer stator 14 which causes the rotor 22 to remain stationary, and simultaneously with this condition there will appear in the inner stator 23 a rotating electromagnetic field which has been delivered from the second variable frequency source 80, which second variable frequency signal will produce a rotating electromagnetic field which will drive the rotor 26 and consequently the signal summing motor output shaft 27 at a rotational speed which is directly proportional to the second variable frequency signal originating in the second variable frequency source 80.

When the signal selector handle 92 is moved from the second position to the third position, which is that position which indicates that only a first variable frequency will be delivered by the signal summing motor, the movement of the handle 92 from the second position to the third position will interrupt the circuit that had been completed by the contact arm 94 with the contact 100, which will deenergize the relay DR and in so doing cause the contacts *a*, *b* and *c* of the relay DR to complete circuits over the back contacts of this relay. When this occurs the first variable frequency source 61 will deliver its multiphase variable frequency signal over the electrical leads 62, 63 and 64, the back contacts *a*, *b* and *c* of the relay DR, leads 50, 51 and 52, to the outer stator 14 of the signal summing motor 11. Accordingly, the stator 14 of the signal summing motor will have a rotating electromagnetic field which bears a direct relationship to the frequency of the first variable frequency source 61.

With the selector handle 92 in the third position, the contact arm 94, as has been noted, completes no circuit but the contact arms 95, 96 and 97 each respectively completes a circuit with the contacts 112, 116 and 121. The completion of this group of circuits will provide the application of the direct current power from the direct current power supply 70 over the electrical leads 71 and 72 to the inner stator 23, over the following circuits which will be traced from the direct current power supply 70. The first circuit includes the electrical lead 71, electrical lead 75, contact 112, contact arm 95, electrical lead 42, spring-loaded brush 37, ring 25, multi-wire cable 21, and finally to the inner stator 23. The electrical lead 71 also completes a circuit through lead 75, lead 76, contact 116, contact arm 96, electrical lead 41, spring-loaded brush 36, ring 20, multi-wire cable 21, and thence to the inner stator 23. Finally, the electrical lead 72 delivers the direct current component of the signal over the lead 72, contact 121, contact arm 97, lead 40, spring-loaded brush 35, ring 15, multi-wire cable 21, and thence to the inner stator winding 23. It will therefore be obvious that there is impressed on the inner stator winding 23 a direct current signal which produces a stationary electromagnetic field which causes the inner rotor 26 to rotate in unison with the inner stator 23. And as has been noted the rotor 22 is being driven at a speed which is directly proportional to the first variable frequency signal which has been delivered to the outer stator 14. Therefore, with the direct current signal impressed upon the inner stator 23, the output shaft 27 of the signal summing motor 11 will have a rotational speed which is directly proportional to the first variable frequency signal which originates in the first variable frequency signal source 61.

With the signal selector control handle 92 in the fourth position, which is that position to the extreme left where the second variable frequency will be subtracted from the first variable frequency, it will be appreciated that the movement of the contact arm 94 will in no way affect the circuit which includes the relay DR, and as a consequence thereof the relay DR remains deenergized and the same circuit just traced with reference to the delivery of the first variable frequency remains unchanged and the first variable frequency source 61 delivers its signals to the outer stator 14 in an uninterrupted manner. There are a number of circuit changes that occur when the signal selector handle is moved all the way to the left. With the handle in this position the contact arm 94 completes a circuit with the contact 101 which therefore permits the completion of a circuit between the positive battery terminal, the handle 92, contact arm 94, contact 101, relay 103, and finally to the negative battery terminal. This will cause the relay 103 to pick up and complete circuits over its front contacts a, b and c. It will be appreciated from a study of the electrical leads that emanate from the second variable frequency source 80 that the leads 81, 82 and 83 pass upwardly from the second variable frequency source 80 and there follow a branch pattern which produces on the one hand the delivery of the multiphase variable frequency signal over the leads 81, 82 and 83 to the first described set of leads 81, 85 and 86, but in this instance since the relay 102 is deenergized, the signal from the second variable frequency source 80 will be delivered via the electrical leads 81, 82 and 83 to the electrical leads 84, 82 and 86, respectively. These electrical leads 82, 84 and 86 will complete a circuit over the front contacts a, b and c of the relay 103. With the contact arm 94 in contact with contact 101 the related contact arms 95, 96 and 97 are in electrical contact with the electrical contacts 111, 115 and 120, and as a result thereof the following circuits are completed between the second variable frequency source 80 and the inner stator 23 of the signal summing motor 11. Tracing each of the circuits as they originate with the electrical leads 81, 82 and 83 in that order, the first circuit includes electrical lead 81, lead 84, front contact b of relay 103, lead 104, contact 115, contact arm 96, lead 41, spring-loaded brush 36, ring 20, multi-wire cable 21, and thence to the inner stator 23. The second circuit starts with the electrical lead 82 and includes the front contact a of the relay 103, the electrical lead 78, electric contact 111, contact arm 95, lead 42, spring-loaded brush 37, ring 25, multi-wire cable 21, and finally inner stator 23. The last circuit starts with the electrical lead 83 and includes the electrical lead 86, front contact c of the relay 103, lead 106, contact 120, contact arm 97, electrical lead 40, spring-loaded brush 35, ring 15, multi-wire cable 21, and finally to the inner stator 23.

It will therefore be appreciated that this series of electrical connections between the second variable frequency source 80 and the inner stator 23 of the signal summing motor 11 will produce a change in polarity of the signals delivered from the second variable frequency source 80 and the consequence of this will be the production of a rotating electromagnetic field in the inner stator 23 which will have a rotational direction which is opposite to the rotational direction induced when the relay 102 had been energized in a manner described earlier. Since it has been stated that the rotating electromagnetic field in the outer stator winding 14 rotated in the same direction as the electromagnetic field that appeared in the inner stator 23 when the relay 102 was picked up, this of course means that with the relay 103 picked up, the direction of rotation of the electromagnetic field in the inner stator 23 will oppose the direction of rotation of the electromagnetic field in the outer stator 14 which will produce, as has been described earlier, a subtraction of the second variable frequency signal from the first variable frequency signal which has been delivered to the outer stator winding 14. The ultimate result is that the rotor 26 and the signal summing motor output shaft 27 will be driven at a speed which is directly proportional to the difference between the first and second variable frequency signals delivered respectively to the outer and inner stators of the signal summing motor.

Accordingly, it will be appreciated that the signal summing motor and system described above provides for the maximum number of variations possible with the presence of two separate variable frequency signals in that the signal summing motor may provide the sum or difference of the signals and either the first variable frequency signal separately or the second variable frequency signal separately. This provides a unit with a great deal of versatility and it will be understood that sudden changes in the first variable frequency signal, which will of course result in an increase in the rotating electromagnetic field in the outer stator winding 14, will of course be reflected ultimately in the rotary movement of the rotor 22, but any sudden change will have to initially overcome the inertia of rotor 22 or rotor 98 before a steady state operating condition arises. This ability to withstand sudden variations within the variable frequency signals being delivered, as well as the change in the power delivered to the signal summing motor provides this signal summing unit with the unique capability of withstanding these sudden changes without any harm to the components of the system. While it is noted that sudden changes may not be instantly reflected in the output shaft of the signal summing motor, the lapse in time before the steady arises in which the output shaft 27 bears a true rotary functional output is measured in infinitesimal fractions of a second which are totally acceptable in view of the economies brought about by the novel structure described hereabove.

Figure 2:
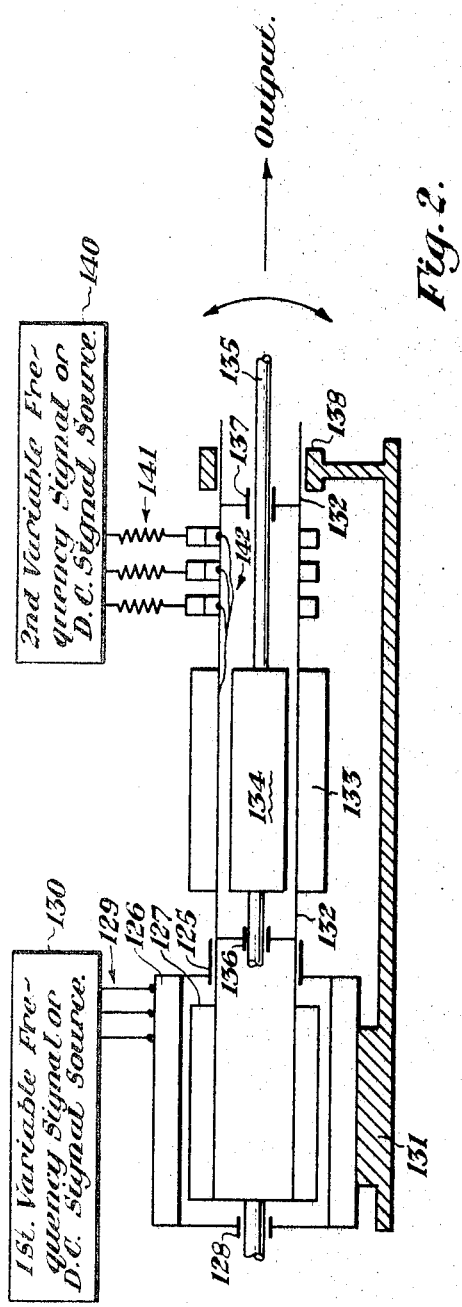
FIGS. 2 and 3 illustrate additional illustrations of signal summing motors which incorporate the invention.
Figure 3:
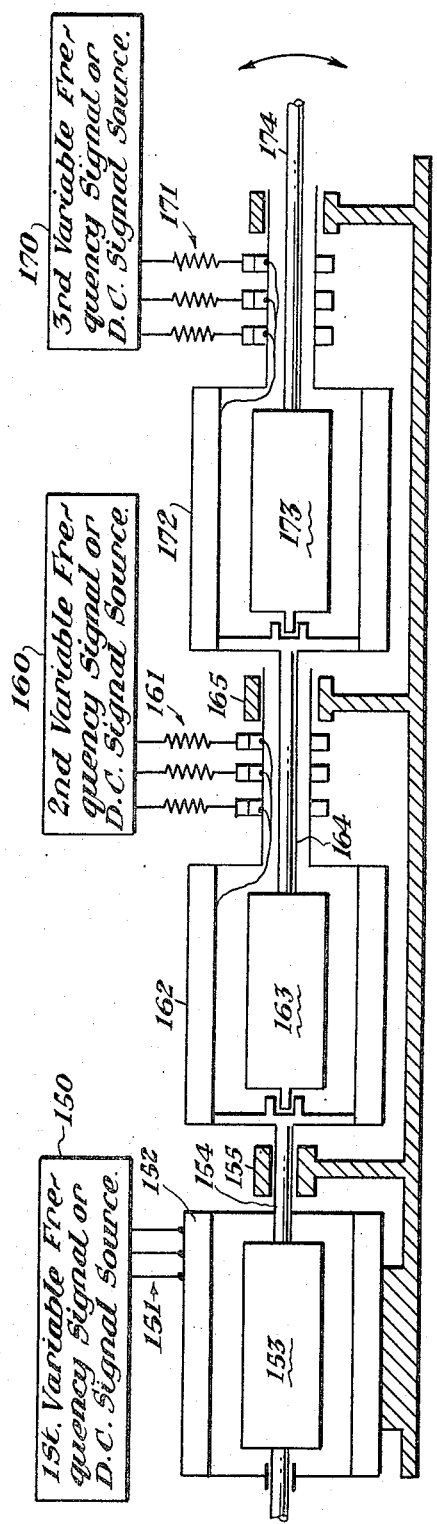

Reference is now made to FIGS. 2 and 3. With specific reference to FIG. 2 there is depicted another embodiment of the signal summing motor set forth in the system of FIG. 1. The signal summing motor arrangement of FIG. 2 functions in precisely the same manner as the signal summing motor in FIG. 1 but sets forth a different structural arrangement to accomplish the same ends. In this FIG. 2 there are provided, for purposes of understanding this embodiment, a first variable frequency signal or direct current signal source 130 and a second variable frequency signal or direct current signal source 140. These two signal sources 130 and 140 are intended to convey the functional equivalent of the signal selection control means 90 and the signal generating means 60 of the system depicted in FIG. 1. With this in mind it will be apparent that there will be delivered over the electrical leads 129 from the first variable frequency signal or direct current signal source 130 one of these two types of signals to what has been designated a stator 126. It is to be understood that these FIGS. 2 and 3 are in schematic form only and are intended to convey conceptually a variation of the summing motor of FIG. 1. Accordingly, the stator 126 is carried by a base 131. Mounted for rotation within the stator 126 is a rotor 127 supported in a pair of bearings 128 and 125. The rotor 127, of course, will be driven at a speed directly proportional to the frequency of the signal delivered from the first variable frequency signal source 130. In the event that a direct current signal is applied via the electrical lead 129 to the stator 126, the resulting electromagnetic field will be stationary and accordingly the rotor 127 will remain stationary within this electromagnetic field.

When this occurs it will be understood that the hollow rotor extension shaft 132, which is integral with the inner rotor 127, will remain stationary also. It goes without saying that when the inner rotor 127 is being driven by the presence of a rotating electromagnetic field in the stator 126, the hollow rotor shaft extension 132 will also be driven as it is an integral part of the rotor 127.

Connected to the hollow rotor extension shaft 132 is a stator 133 integral with this hollow shaft 132. The stator structure 133, in this embodiment, has been separated from the rotor structure 127 and the stator 133 has a separate source of power delivered from the second variable frequency signal or direct current signal source 140 over the electrical leads 141 and 142 to the stator 133. The outer end of the hollow rotor shaft extension 132 is supported in base bearing 138 at the right-hand end of the overall structure. Interposed for driving rotation within the stator structure 133 is the rotor 134 which has integral therewith the signal summing motor output shaft 135. The rotor 134 and the shaft 135 are supported for rotation by bearings 136 and 137. In this embodiment it will be seen that since the stator 133 is removed from the vicinity of the rotor 127, any electrical fields which are produced within the stator structure 133 can in no way affect the electrical fields that arise in the stator or rotor structures 126 and 127, respectively. The function of this unit is exactly the same as that function that occurred in the signal summing motor of the system depicted in FIG. 1. In other words, when a direct current signal is applied from the direct current signal source 140 via leads 141 and 142 to stator 133, the rotor 134 remains fixed in position with reference to the stator 133 because of the stationary electromagnetic field that appears in the stator 133. In the event that a second variable frequency signal is delivered to the stator 133 via leads 141 and 142, there would then appear within the stator 133 a rotating electromagnetic field which of course would cause the rotor structure 134 to follow this rotating electromagnetic field and, depending upon the signal delivered to the stator 126, there would be a summing of the first and second variable frequency signals on the one hand, or the subtraction of the second variable frequency signal from the first variable frequency signal according to the principles set forth with reference to FIG. 1. Finally, the arrangement could provide an output on the rotational speed of the signal summing motor output shaft 135 which would bear a direct relationship to either the first variable frequency signal or a separate and distinct output which would bear a direct functional relationship to the second variable frequency signal delivered by this source 140.

As has been noted at the outset of this specification, the system has been described with reference to a pair of variable signal sources but the invention is not to be constrained in its interpretation to limit the invention to but a pair of variable signal sources. In other words, the system is capable of adding a plurality of variable signal sources as well as providing the capability of permitting the subtraction of any one variable frequency signal from the remaining signals. This ability is explained in the embodiment of the invention set forth in FIG. 3 where there is illustrated three variable frequency signal sources 150, 160 and 170. Each of these signal sources also has the capability of delivering a direct current signal as the case may require. The control of the direct current signal and the polarity of the variable frequency signal delivered of course is made in accordance with the teachings set forth with reference to the system described in FIG. 1.

The first variable frequency signal or direct current signal source 150 is connected via electrical leads 150 and 151 to a stator 152, which stator 152 has a rotor 153 mounted for rotation within this stator structure 152. Integrally connected to the rotor 153 is a rotor shaft 154, which rotor shaft is in driving connection with the stator structure 162 of the unit next appearing adjacent to the first stator structure 152. Accordingly, where a variable frequency signal is delivered to the first stator structure 152, the rotating electromagnetic field induced in this stator will cause a resultant rotation of the rotor 153 which in turn will cause the rotor shaft 154 to drive in a rotary manner the stator structure 162. In the event that a direct current signal is delivered from the signal source 150 via the leads 151 to the stator 152, a stationary electromagnetic field will appear and the rotor structure 153 will remain stationary with respect to the stator structure 152. This will cause the adjacent stator structure 162 to also remain stationary. With this operation in mind it will be seen that there is a second variable frequency signal source 160 whch delivers via the leads 161 this second variable frequency signal through the related leads to the stator 162. The second variable frequency source 160 also has the capability of delivering a direct current signal. In the event that there is a second variable frequency signal delivered to the stator structure 162 there would appear in the stator 162 a rotating electromagnetic field which would induce the rotation of the rotor structure 163 positioned within the stator structure 162. The rotation of the rotor structure 163 would produce a rotary output appearing in the rotor shaft 164 which would in turn cause the stator structure 172 immediately adjacent to the stator-rotor arrangement 162, 163 to be driven at a rate directly proportional to the second variable frequency signal delivered to the stator 162 from the second variable frequency signal source 160.

Positioned within the stator structure 172 there is a rotor 173 which is connected to a rotor output shaft 174 which in this embodiment represents the signal summing motor's output shaft. In a manner similar to that described, a third variable frequency signal source 170 is electrically connected via the electrical leads 171 to the stator 172, and this stator-rotor arrangement 172, 173 cooperates in precisely the same manner described with reference to stator-rotor structure 162, 163. It will be appreciated also that a direct current signal will be delivered by the signal source 170 over the electrical lead 171. It should also be recalled that the polarity of the variable frequency signal may be controlled from either the second variable frequency signal source 160 or the third variable frequency signal source 170, in the event that all of the signals delivered from the second variable frequency signal source 160 and the third variable frequency signal source 170 are of a positive nature. By that it is meant that the rotating electromagnetic fields induced in the respective stators 162 and 172 rotate in the same direction as the electromagnetic field induced in the stator 152 by the first variable frequency signal from signal source 150, then the first and third variable frequency signals will be added one to the other, and the system will have an output represented by the rotational movement of the signal summing motor output shaft 174 which bears a direct relationship to the sum of the frequencies of the signals delivered to the respective stators. In the event that either the second variable frequency signal or the third variable frequency signal 160 and 170, respectively, takes on an opposite polarity and thereby induces in their respective stators 162 and 172 an electromagnetic field which rotates in an opposing direction, then this negative polarity will produce a mechanical subtraction of the frequency being delivered in the reverse or negative polarity mode of operation, and the unit therefore displays the basic capability of subtracting any one of a multiple of variable frequency signals delivered to the signal summing motor arrangement.

While this figure sets forth an embodiment in which three variable frequency signals may be added, subtracted, or delivered separately, it is to be understood that the system may be expanded or contracted to meet the needs of the system and the usage intended. Furthermore, it will be understod that in the event that any one of the variable frequency signals which have ben delivered to any of the signal summing motors described herebefore may take a negative or reverse polarity characteristics, and should the frequency of this signal which causes an electromagnetic field to rotate in an opposite direction in any one of the given stators exceed the rotational speed of the mechanical input to the particular stator involved, then of course as the value of the frequency delivered to one stator comes to equal the frequency of the negative polarity signal delivered to a second stator, this would result in an output which of course would be zero. In the event that the negative variable frequency signal is of a greater value than the positive variable frequency signal, then the final rotational direction of the output shaft of the signal summing motors would reverse its direction and this reverse direction would be indicative of a negative value. Therefore, it will be seen that the system provides a signal summing motor which provides an output which is the algebraic sum of the variable frequency signals delivered to the signal summing motor. The output of the signal summing motor is positive where the rotation is in one direction and negative when the rotation of the signal summing motor output shaft is in an opposite direction.

While the present invention has ben illustrated and described in connection with the details and illustrative embodiments thereof, it should be understood that those are now intended to be limitative of the invention as set forth in the accompanying claims.

Having thus described my invention, what I claim is:
1. A signal summation motor
  (a) said signal summation motor having an output shaft the rotational speed of which is a function of the algebraic sum of the signals delivered to said summation motor,
  (b) signal generating means for producing a plurality of variable frequency signal outputs or a neutral signal output,
  (c) signal selection control means which controls the delivery of said signal generating means outputs to said signal summation motor, said signal selection control means including variable frequency signal polarity reversing means to thereby provide a variable frequency signal substraction ability to said signal summation motor.

2. The signal summation motor of claim 1 wherein said signal generating means includes a first variable frequency signal source and a second variable frequency signal source.

3. The signal summation motor of claim 2 wherein said signal summation motor is a multiphase induction motor.

4. The signal summation motor of claim 3 wherein said first and second variable frequency signal sources are of a multiphase nature and said neutral signal source is of a direct current nature.

5. The signal summation motor of claim 4 wherein said summation motor has at least two rotor elements and an outer stator arrangement positioned externally of said rotor elements, and at least one of said rotor elements having integral therewith an inner stator, another of said rotor elements drivingly connected to said summation motor output shaft.

6. The signal summation motor of claim 5 wherein said signal selection control means controls the delivery of said signal generating means outputs of variable frequency or said neutral signal to said stators.

7. A signal summation induction motor
  (a) said signal summation induction motor having at least two rotor elements and an outer stator arrangement positioned externally of said rotor elements,
    (1) at least one of said rotor elements having integral therewith an inner stator,
    (2) another of said rotor elements drivingly connected to a summation motor output shaft,
      said output shaft having a rotational speed which is the function of the algebraic sum of signals delivered to said stators,
  (b) signal generating means for producing a plurality of variable frequency signal outputs or a neutral signal output,
  (c) signal selection control means, said signal selection control means controlling the delivery of said signal generating means outputs to said outer and and inner stators of said signal summation induction motor.

8. The signal summation induction motor of claim 7 wherein said signal generating means includes a first variable frequency source and a second variable frequency signal source.

9. The signal summation motor of claim 8 wherein said signal summation motor is a multiphase induction motor.

10. The signal summation motor of claim 9 wherein said first and second variable frequency signal sources are of a multiphase nature and said neutral signal source is of a direct current nature.

11. The signal summation motor of claim 10 wherein said signal selection control means controls the delivery of said signal generating means outputs of variable frequency or said neutral signal to said stators.

12. The signal summation motor of claim 11 wherein said signal selection control means includes variable frequency signal polarity reversing means to thereby provide a variable frequency signal substraction ability to said signal summation motor.

13. An algebraic signal summing motor of a multiphase induction type,
  (a) said algebraic signal summing induction motor having at least two rotor elements and an outer stator arrangement positioned externally of said rotor elements,
    (1) at least one of said rotor elements having integral therewith an inner statror,
    (2) another of said rotor elements drivingly connected to a summing motor output shaft,
      said output shaft having a rotational speed which is the function of the algebraic sum of signals delivered to said stators,
  (b) signal generating means for producing a plurality of multiphase variable frequency signal outputs or a neutral direct current signal output,
  (c) signal selection control means, said signal selection control means controlling the delivery of said signal generating means outputs of multiphase variable frequency as well as said neutral direct current signal to said outer and inner stators of said signal summing induction motor.

14. The algebraic signal summing motor of claim 13 wherein said algebraic signal summing motor has outer and inner rotor elements concentrically mounted for rotation about a common axis, the inner rotor element having a driving connection to said signal summing motor output shaft, said outer rotor having said inner stator integral therewith.

15. The algebraic signal summing motor of claim 14 wherein said signal generating means includes a first multiphase variable frequency signal source and a second multiphase variable frequency signal source.

16. The algebraic signa summing motor of claim 14 wherein said summing motor output shaft has a rotational speed which is a direct function of said first multiphase variable frequency signal delivered to said outer stator when said neutral direct current signal is simultaneously delivered to said inner stator, said summing motor output shaft having a rotational speed which is a direct function of said second multiphase variable frequency signal delivered to said inner stator when said neutral direct current signal is simultaneously delivered to said outer stator, said summing motor output shaft having a rotational speed which is a direct function of the algebraic sum of said first and said second multiphase variable frequency signals when said first and said second multiphase variable frequency signals are simultaneously applied respectively to said outer and inner stators.

References Cited

UNITED STATES PATENTS

| 1,450,339 | 4/1923 | Smith et al. | 318—231 X |
| 1,450,340 | 4/1923 | Smith et al. | 318—148 X |
| 1,983,896 | 12/1934 | Böttcher | 318—205 |
| 2,230,731 | 2/1941 | Stohr | 318—197 |
| 2,896,143 | 7/1959 | Bekey | 318—231 X |

ORIS L. RADER, *Primary Examiner.*

GENE RUBINSON, *Assistant Examiner.*

U. S. Cl. X.R.

318—187, 197, 205, 231